United States Patent [19]

Baudouin et al.

[11] 3,998,651
[45] Dec. 21, 1976

[54] COMPOUND OF CALCIUM CARBONATE AND OF TOBERMORITES, ITS MANUFACTURE AND ITS APPLICATIONS

[75] Inventors: Jacques Baudouin, Montelimar; Jean-Pierre Caspar, Le Teil, both of France

[73] Assignee: Lafarge S.A., Paris Cedex, France

[22] Filed: Nov. 1, 1974

[21] Appl. No.: 520,103

[52] U.S. Cl. .............................. 106/306; 106/102
[51] Int. Cl.² ........................................ C09C 1/02
[58] Field of Search ........................... 106/306, 102

[56] References Cited
UNITED STATES PATENTS 2,819,172   1/1958   Trief ................................ 106/102

Primary Examiner—Winston A. Douglas
Assistant Examiner—J. V. Howard
Attorney, Agent, or Firm—Ernest F. Marmorek

[57] ABSTRACT

A compound of calcium carbonate and of hydrated tobermorites, constituted of 70 to 15% tobermorites, which may contain free hydrated silica in amounts to 0 to 15% in weight expressed in $SiO_2$, and of 30 to 85% calcium carbonate. The process includes completely hydrating white Portland cements between about 5 and 100° C to form a paste having a dry extract of 5 to 70% by weight until at least a decrease in the pH-value occurs.

The compound is an industrial charge particularly for paper-making and paint-making industries.

9 Claims, No Drawings

COMPOUND OF CALCIUM CARBONATE AND OF TOBERMORITES, ITS MANUFACTURE AND ITS APPLICATIONS

BACKGROUND OF THE INVENTION

The invention relates to a novel compound, hydrated calcium carbonate and tobermorites, as well as to a process for the manufacture of this compound and its different applications, notably as charges for the paper and paint producing industries.

The compound of the invention has the following constitution:

70% to 50% by weight of tobermorites, which may contain an amount of free hydrated silica from 0 to 15% by weight, expressed in $SiO_2$, and 30 to 85% by weight of calcium carbonate.

The products presently known on the market for use as charges are the following: natural and synthetic calcium carbonates, dolomite, barium sulfate, talc, silica, synthetic silico-aluminates, kaolins, pyrogenated kaolins, and natural and synthetic Wollastonite.

SUMMARY OF THE INVENTION

The starting products utilized in the present invention, which products are anhydrous substances, are white cements, that is, white Portland cements. As anhydrous substances, these products principally contain di-, and tri-calcium silicates. Other products such as white limes, enriched in di-, and/or tri-calcium silicates, are likewise suitable. Finally, it is likewise suitable to utilize these silicates by themselves, particularly the tri-calcium silicate. These products can be utilized in their clinker form, that is, the baked or calcinated balls coming from the kiln, in which case it will be necessary to grind them prior or during hydration.

The commercially available form of the artificial white Portland cement and all other mixtures of artificial commercial cement with whitening products such as gypsum and white pouzzolanas added are appropriate for the process of the invention.

The instant features completely hydrating a selected anhydrous cement substance at a temperature in the range of about 10° to 100° C in presence of an excess of water by forming a water paste having 5 to 70% by weight dry extract, subsequently, carbonating with $CO_2$ and collecting the desired compounds, the carbonation process being stopped upon the occurrence of drop in the pH. In accordance with the invention, the hydration can be carried out in a continuous or discontinuous manner.

The hydration reaction furnishes a mixture of hydrates, principally containing hydrated calcium silicates, generally referred to as tobermorites having the formula $x$ CaO . $y$ $SiO_2$ . $z$ $H_2O$, with $x/y$ being between about 0.40 and 3.00, and $z/y$ being between about 0.5 and 6. The hydrate mixture furthermore contains hydrated lime or slaked lime, $Ca(OH)_2$. It is noted that afwilite, the chemical formula of which is 3 CaO . 2 $SiO_2$. 2 to 4 $H_2O$, is a particular type of the tobermorites.

Once the hydration is terminated, which is easy to determine by means of crystallographic analysis with the aid of X-ray diffraction methods, the carbonation of the hydrated lime can be undertaken. This carbonation is carried out by allowing $CO_2$ to bubble into the agitated aqueous hydrate or by agitating this paste in presence of sodium bicarbonate or any other substance capable of liberating $CO_2$. It is particularly interesting to utilize as a $CO_2$ source the gases coming out of the cement kilns, which gases contain $CO_2$ in quantities of about 20% by volume.

The carbonation is carried out between about 20° and 100° C and is continued so as to carbonate all of the lime present. The end of this carbonation can be easily determined by measuring the pH which is about 12.4 pH when lime is present in the medium and abruptly decreases to a value of less than about 11 pH when free lime is no longer present. Depending on the hydration conditions, and depending on the degree of the carbonation, one obtains tobermorites containing varying proportions of calcium, which is normal, as the term "tobermorites", covers a group of related products. As the limit, by undertaking a very forceful carbonation after hydration, or by carbonating during hydration, one obtains hydrated silica in place of tobermorites.

The instant invention features a continuous production of compounds corresponding to the limits indicated above.

The process of the invention directly furnishes a paste which is an aqueous suspension of a mixture to tobermorites and/or afwilite and of calcium carbonate. This paste can be concentrated by customary filtration means, such as a filter press. It can be dried by processes usually utilized for the drying of mineral products, for example by atomization.

The invention accordingly comprises the several steps and the relation of one or more of such steps with respect to each of the others, all as exemplified in the following detailed disclosure, and the scope of the application of which will be indicated in the claims.

DESCRIPTION OF THE PREFERRED EMBODIMENTS

In carrying the invention into effect embodiments have been selected for description in this specification.

The examples which follow are intended to be non-limiting. All percentages in the examples are by weight unless otherwise stated.

EXAMPLE 1

Into a grinder of the corundum-jar-type, filled with corundum balls and water, there is placed commercial white Portland cement of the following composition:

| | | |
|---|---|---|
| $SiO_2$ | 23.7 | parts by weight |
| CaO | 69.3 | parts by weight |
| $Al_2O_3$ | 2.7 | parts by weight |
| $SO_3$ | 1.19 | parts by weight |
| $Fe_2O_3$ | 0.28 | parts by weight |
| volatile materials | 1.80 | parts by weight |
| insoluable substances | 0.11 | parts by weight and |
| different substances to make up 100 parts by weight | | |

The utilized proportions are such that:
a. one third of the space is filled with the corundum balls,
b. one third of the space is filled with water and cement, with water being present in weight proportions equal to three times the weight of the cement, and
c. one third of the space is left free to aid the grinding process.

The hydration is carried out at about 60° C. By standard analytical means used by the cement workers such as X-ray diffration analyses and a study of the percentage of bound water, there is observed that the hydration is terminated after about 15 hours of grinding, and that the product formed includes a mixture of tobermorites, of which afwilite, and hydrated lime.

Carbon dioxide is then introduced into the grinder by any of the previously cited processes and the grinding is continued for about two hours. By means of X-ray diffraction analysis it can be observed that there results a mixture of the hydrate 3 CaO . 2 $SiO_2$ . 3 $H_2O$ and of $CaCO_3$ constituting the desired charge. The study of the quantities of bound water and bound $CO_2$ capable of being liberated at different temperatures has established the fact that about half of the mixture consists of the two cited salts. A study of the yield of the reaction has shown that: 100 parts by weight of cement fixes 25 parts by weight of water, and then 25 parts by weight of $CO_2$, leading to 150 parts by weight of the desired charge.

Under these working conditions, the concentration of the dry material in the resulting paste was in the order of 35.3% by weight.

The paste can be passed through a filter press under a pressure of about 10 bars in order to concentrate the paste to a thickness of, for example, a 50% by weight concentration. This paste can be used just as it is in the numerous cited applications. This paste can also be dried, for example, through atomization.

After drying the paste a white powder is obtained in the case of the present example and the powder has the following characteristics:

granulometric measurements carried out by means of a laser granulometer: 100% passed at 8 microns;
average diameter of particles: 2 microns;
whiteness measured by photocolorimeter at λ = 574.5 mµ; whiteness β = 95.2%;
specific surface (B.E.T. method) = 13.1 m²/g;
oil absorption ("Rub out Test" method; standard AFNOR T 30-022): 55 g per 100 g;
solubility in water = 0.83 g per 100 g ("Codex-" method);
abrasiveness ("valley" method): 15 milligrams;
pH at saturation in water: 10.7 pH;
loss on firing at 1000° C: 36.8% by weight;
specific gravity = 2.15;
the chemical analysis of the powder obtained after loss on firing at 1000° C is the following:

| $SiO_2$: | 22.25% by weight; | MgO: | 0.53% by weight |
|---|---|---|---|
| CaO: | 70.81% by weight; | $K_2O$, $Na_2O$: | 0.1% by weight. |
| $Al_2O_3$: | 2.65% by weight; | | |

Due to the high order of magnitude of its specific surface and to the low order of magnetude of its specific gravity, the charge constituted by this powder, when in dispersion in a liquid, displays a very slow sedimentation and can be utilized as anti-settling agent.

In form of a thick paste, for example, of a 40% dry extract in water, the charge according to the invention, owing to the ionic interactions of the free water with the water of constitution of the hydrates, displays a rheological characteristic of thixotropy, a characteristic very much in demand in paints, in the coating of paper, and the like.

EXAMPLE 2

The raw materials of example 1 can be hydrated and then is carbonated in the manner described in applicants' concurrently filed patent application "New Compound of Calcium Carbo-aluminare and of Tobermorites, Process of Its Manufacture and Its Applications". The operations are then much more rapid, as they extend only over a few hours and the compound according to the invention, as a function of the utilized raw materials, is obtained at a relatively low price, with preliminary tests determining in each case the temperatures, the water quantities, the duration of the agitation, and the quantities of $CO_2$ gas to be set to work.

I. PAPER-MAKING-INDUSTRY

1. In the customary manner one prepares a coating preparation of the following composition:

| | | |
|---|---|---|
| charge according to the invention | 100 | parts by weight |
| water | 100 | parts by weight |
| dispersing agent (e.g. poly-salt of BASF) | 1 | parts by weight |
| acrylic emulsion ("Acronal 29OD of the BASF at 50% dry extract) | 20 | parts by weight |
| starch solution at 25% dry extract | 40 | parts by weight |
| calcium stearate | 1 | parts by weight |
| anticryptogamic agent | 0.2 | parts by weight |

This coating preparation had the following characteristics:

| | |
|---|---|
| — dry extract | = 46.2% |
| — pH | = 11.1 pH |
| — viscosity [Brookfield] at 10 rpm | = 5,800 cp |
| — viscosity [Brookfield] at 100 rpm | = 500 cp |
| — fineness | = 100% inferior to 8 microns. |

During coating of a standard unfinished paper, the following characteristics have been obtained:

— weight of deposited coating: 10.40 g/m²/surface;
— opacity of the coated paper (only one surface was coated): 88.2%
— whiteness: 89%.

2. The coating preparations corresponding to the formulas A, B and C listed below have been prepared, with the aim in mind of comparing a standard kaolin of good quality for coating purposes with the charge of the invention.

The general formula is the same as the one given in example 1, however, the quantities of the charges have been replaced by the proportions listed below and the quantities of water have been adjusted in a manner so as to obtain in each case a dry extract of constant weight:

| Composition of the charge: | A: | B: | C |
|---|---|---|---|
| kaolin "Dinkie A" quality: | 100: | 80: | 0 |
| charge according to invention: | 0: | 20: | 100 |
| | | (parts by weight) | |
| Formulas: | A: | B: | C |

-continued

| | | | |
|---|---|---|---|
| dry extract (weight): | 50%: | 50%: | 50% |
| pH (without correction): | 6.3: | 11.1: | 12.0 |
| fineness: | <8 μ: | <8 μ: | <8μ |
| viscosity centipoises measured by means of the BROOKFIELD viscometer: | | | |
| at: 10 rpm: | ,800: | ,800: | ,100 |
| at: 100 rpm: | 860: | 1,200: | 1,450 |

The characteristic properties measured on a standard unfinished paper, which had been coated under the same conditions and with the same adjustments are the following:

| Formulas: | A | B | C |
|---|---|---|---|
| weight of the deposited coating in g/m²/surface: | 12.4: | 11.7: | 8.8 |
| opacity (only one surface was coated): | 96.5: | 96.7: | 97.3 |
| coating adherence number of the "Dennison" wax corresponding to the tear-off: | 11: | 11: | 11 |
| whiteness: | 80: | 84: | 87 |

These examples show that the charge according to the invention is well suited for the coating of paper and contributes advantages, certain ones of which are highly desired by the paper manufacturers, such as:
a. satisfactory fineness and whiteness;
b. an opacity superior to that provided by the best of the known kaolins;
c. a basic pH which confers to the coating preparations a basic character without the necessity of adjustments of the pH-values. This results in a very good stability of the coating preparations containing the synthetic dispersions, that is, those which are only stable in a basic medium; and
d. lower weight of the deposited coating (in the order of 7.5%) for an equal deposited volume, owing to the low specific gravity of the charge according to the invention.

The above results show particularly well the fact that the charge according to the invention allows one to deposit light coatings. Thus, if one sets out to view the weight of the coating as the criterium to strive for, one could choose to deposit thicker coatings by utilizing the charge according to the invention, which allows one to utilize papers which are less even or smooth and therefore lower priced. In this manner, by utilizing the charge according to the invention, one could deposit coatings of equal thicknesses and profit thereby as it concerns the weight of the paper, which is of interest if the coated paper has to be transported.

As a matter of fact, in the cases of the cited examples A, B and C, it has been observed that with the same adjustments of the machines and the same dry extracts of the coating preparations, thus the same deposited dry volumes, there is obtained a reduction of the weight of the deposited coating in the order of 5.6% by utilizing a mixture of charges containing 20% of the charge according to the invention and a reduction of 30% of the weight of the coating by utilizing the charge according to the invention as sole charge of the formulation, this reduction being with reference to the formulation in which kaolin is utilized by itself as the charge material. 3. The two following examples point out the importance of other advantages contributed by the charge according to the invention.

The quantities of the pigments and of the binders of example 1 are replaced by the quantities listed below, the rest of the formula being equivalent to the one of formula 1, and an optical blueing agent is added. The mixture is prepared by making a paste, by making a dispersion and by adjusting the viscosity, as it is customary to do in the trade.

The pH is not adjusted and takes on the values listed below:

| | | |
|---|---|---|
| Formula D | | |
| Kaolin | 100 | parts by weight |
| starch (dry) | 8.5 | parts by weight |
| latex (dry) | 8.5 | parts by weight |
| Formula E | | |
| charge according to the invention | 100 | parts by weight |
| starch (dry) | 9.5 | parts by weight |
| latex (dry) | 9.5 | parts by weight. |

These formulas have been adjusted in a manner so as to obtain a dry extract of 42.5% by weight at the time of the application. The application was carried out in a manner so as to furnish coating layers of 12 g/m²/per surface. Under those conditions, the following results have been obtained with a coated paper.

| charge: | Formula D kaolin: | Formula E according to invention |
|---|---|---|
| pH of the coating preparations: | 6.8: | 11 |
| dry extract at time of application: | 42.5%: | 42.5% |
| weight of deposited coating: | g/m²/face: | g/m²/face |
| whiteness of coated paper: | | |
| opacity of coated paper: | 87.8: | 88.7 |
| efficiency of optical blueing agent: | 2.8%: | 4.5% |

These examples clearly show the advantage of the whiteness, of the opacity, of the efficiency of the blueing agents contributed by the charge according to the invention.

II. PAINTS

Starting from the products of the invention, either in form of an aqueous dispersion or in dried form, paints and coatings, in particular paints for structures such as buildings, houses, vessels, ships of a base consisting of vinylic emulsions, acrylic emulsions, polyurethane, and the like can be prepared. Owing to its basic character, the charge is also very well suitable for the anti-corrosive paints and sizings produced with non-acidic binders. Due to these rheological characteristics, the charge can be utilized as a thickening and anti-settling agent.

EXAMPLE A

A decorative rough coat of plaster of an acrylic emulsion base formed from the invention.

Paints for structures such as buildings, houses, vessels, ships can be prepared and, in particular, a formula for a decorative coat of plaster with a synthetic binder base, paints highly appreciated for its decorative effects and its relief effects, allowing it to satisfactorily masks defects can be prepared.

A paste of the chemicals listed below is made by mixing the elements of part I of the formula given below, until a good dispersion of the charge is obtained:

| | | |
|---|---|---|
| water | 9 | parts by weight |
| 25% solution of deflocculating agent | 0.1 | |
| charge according to the invention | 24 | |
| titanium dioxide (anatase) | 1 | |
| I acrylic dispersion of 50% dry substances (Styrofoam from the BASF) | 27 | |
| 5% methylcellulose solution | 3 | |
| butyl glycol | 1 | |
| di-octylphthalate | 0.5 | |
| anti-foaming agent | 0.05 | |

Subsequently one adds

| | | |
|---|---|---|
| II washed river sand, 0.8 – 2 mm | 5 | parts by weight |
| fine quartz sand | 30 | parts by weight |

The sand is dispersed slowly in the rest of the formulation. A quantity of water necessary for the viscosity of the paint to attain 3,500 centipoises (BROOKFIELD viscometer, 10 rpm) is added.

In this manner one obtains a thixotropic paint of the following characteristics:

| | | |
|---|---|---|
| pH | = | 10.7 pH |
| dry extract | = | 73.8% by weight |
| pigment/binder-ratio | = | 4.36/1. |

This coat of plaster can be applied by means of spattle, or by means of a brush, by means of a rubber roller, etc. It can be put on in a manner so as to furnish decorative effects. The main advantages contributed through the use of the charge of the invention are the following:

the thixotropy developed by the charge and permitting thick applications without run-off;

the basic character of the charge, which allows one to obtain a coat of plaster stable with time and does not necessitate the adjustment of the pH during manufacture; and the high degree of whiteness and the opacifying ability developed through the high degree of fineness which allows one to reduce the introduced quantity of the titanium dioxide.

EXAMPLE B

White paint emulsion.
One prepared the following paint

| | Parts by Weight | in% |
|---|---|---|
| water | 60 | 23.4 |
| 5% tripolyphosphate | 4 | 1.5 |
| charge according to the invention | 60 | 23.4 |
| 50% vinylic "Afcolac"-emulsion | 80 | 31.2 |
| titanium dioxide (rutile) | 20 | 7.8 |
| 5% solution of "Natrosol" | | |

-continued

| | Parts by Weight | in% |
|---|---|---|
| colloid protector | 15 | 6 |
| dioctylphthalate | 2 | 1 |
| butyl glycol | 4 | 2 |
| pin tar oil | 1 | 0.5 |
| water for desired viscosity | 10 | 4 |
| | 256 | 100.8 |

This paint has a dry extract of 47% by weight. The pigment/binder-ratio amounts to about 2. Its viscosity is 300 centiposes at 10 rpm (BROOKFIELD viscometer). Its manufacture does not necessitate the adjustment of the pH and its stability with time is good. It is thixotropic and is easily applied and does not run after application.

We wish it to be understood that we do not desire to be limited to the exact details shown and described, for obvious modifications will occur to a person skilled in the art.

Having thus described the invention, what we claim as new and desire to secured by Letters Patent, is as follows:

1. A composition of calcium carbonate and hydrated tobermorites, consisting of from about 70 to about 15 per cent by weight of tobermorites, which may contain an amount from 0 to 15 per cent by weight of free hydrated silica expressed as $SiO_2$, and of from about 30 to about 85 per cent by weight of calcium carbonate.

2. The composition as claimed in claim 1 for use as an industrial charge, in the form of a powder having a particle size of about 2 microns.

3. The composition as claimed in claim 2, further comprising water to form a paste.

4. In a process for preparing a composition of calcium carbonate and tobermorites, the improvement in combination therewith comprising the steps of:
hydrating a white Portland cement at a temperature from about 5° to about 100° C with water and agitation to form a paste including lime and having a dry extract of from about 5 to 70 per cent by weight; and
carbonating said paste at least until all of said lime has been chemically changed into calcium carbonate, whereby a decrease of the pH-value of said paste occurs.

5. The process as claimed in claim 4, wherein said carbonating is with carbon dioxide or a source capable of supplying carbon dioxide.

6. The process as claimed in claim 4, further comprising measuring the pH-value of said paste.

7. The process as claimed in claim 4, wherein the decrease in the pH-value is an abrupt change.

8. In the preparation of a paint, the improvement in combination therewith comprising the steps of:
hydrating a white Portland cement at a temperature from about 5° to about 100° C with water and agitation to form a paste including lime and having a dry extract of from about 5 to about 70 per cent by weight;
carbonating said paste at least until all of said lime has been chemically changed into calcium carbonate, whereby a decrease of the pH-value of said paste occurs; and adding the carbonated paste to the paint.

9. In the preparation of a coating for paper, the improvement in combination therewith comprising:

hydrating a white Portland cement at a temperature from about 5° to about 100° C with water and agitation to form a paste including lime and having a dry extract of from about 5 to about 70 per cent by weight;

carbonating said paste at least until said lime has been chemically changed into calcium carbonate, whereby a decrease of the pH-value of said paste occurs; and applying the carbonated paste to the surface of the paper.

* * * * *